United States Patent [19]
Lallier

[11] Patent Number: 5,992,578
[45] Date of Patent: Nov. 30, 1999

[54] BRAKING DEVICE

[75] Inventor: Jean-Claude Lallier, Crepy-en-Valois, France

[73] Assignee: Poclain Hydraulics, Verberie Cedex, France

[21] Appl. No.: 09/046,829

[22] Filed: Mar. 24, 1998

[30] Foreign Application Priority Data

Mar. 27, 1997 [FR] France .................................. 97 03746

[51] Int. Cl.⁶ .................................................. F16D 55/22
[52] U.S. Cl. ...................... 188/72.3; 188/170; 188/106 F
[58] Field of Search ................. 188/72.3, 71.5, 188/170, 167, 72.6, 72.7, 73.2, 366, 367, 106 F

[56] References Cited

U.S. PATENT DOCUMENTS

| | | | |
|---|---|---|---|
| 4,245,724 | 1/1981 | Beck | 188/170 |
| 5,220,790 | 6/1993 | Allart et al. | 60/435 |
| 5,333,705 | 8/1994 | Lemaire et al. | 188/170 |

FOREIGN PATENT DOCUMENTS

| | | |
|---|---|---|
| 2655091 | 5/1991 | France . |
| 2672940 | 8/1992 | France . |
| 2695695 | 3/1994 | France . |

*Primary Examiner*—Robert J. Oberleitner
*Assistant Examiner*—Mariano Sy
*Attorney, Agent, or Firm*—Ladas & Parry

[57] ABSTRACT

A braking device comprises first and second braking device respectively constrained to rotate with the brake case and with a brake shaft. The device comprises a braking piston, resilient device for displacing the piston axially towards a braking position, hydraulic device for displacing the piston axially in the opposite direction towards a brake-release position, and mechanical brake-release device for bringing the piston into its brake-release position and for holding it there. These mechanical brake-release device comprise at least two brake-release systems each comprising a bore having at least one substantially radial first segment, a screw displaceable in the bore, and displacement transfer device comprising at least one intermediate member suitable for transforming the radial displacement of the screw into axial displacement for pushing away the piston.

12 Claims, 5 Drawing Sheets

BRAKING DEVICE

FIELD OF THE INVENTION

The present invention relates to a braking device and to a hydraulic motor fitted with such a device.

The braking device comprises:

a brake case in which there is disposed an internal member, said case and said internal member being capable of rotating relative to each other about an axis of rotation;

first braking means constrained to rotate with the brake case;

second braking means constrained to rotate with the internal member;

a braking piston having a first face directed towards the inside of the case and having a thrust zone extending substantially transversely relative to the axis of rotation;

resilient means for urging the braking piston axially in a first direction towards a braking position in which the thrust zone urges the first and second braking means axially into braking contact;

hydraulic means for displacing said braking piston axially in a second direction towards a brake-release position in which the braking contact is eliminated; and mechanical brake-release means for bringing the braking piston into its brake-release position, and for holding it there, said means comprising a screw cooperating with a tapped region;

the first and second braking means and the thrust zone of the braking piston being generally circularly symmetrical about the axis of rotation.

BACKGROUND OF THE INVENTION

Patent FR-A-2 655 091 discloses a hydraulic motor whose braking piston includes, on its outside face, an axial tapped region in alignment with the axis of rotation of the motor. To provide mechanical brake release, a screw passing through a central bore of the motor cover situated outside the brake piston can be screwed into said tapped region while its head is directly or indirectly in abutment against the cover, thereby displacing the braking piston in the second direction and holding it in the brake-release position. That system is effective, providing it is possible to gain access to the head of the screw, and that requires sufficient space next to the axial end of the motor adjacent to the cover. This is not always the case, since the motor may be placed in a space of small dimensions, or, for example, it may be axially integrated in the transmission system of a vehicle.

OBJECT AND SUMMARY OF THE INVENTION

The present invention seeks to provide mechanical brake-release means that can be implemented easily and effectively from an axially-extending face of the motor, and not from an axial end thereof.

This object is achieved by the fact that the mechanical brake-release means comprise at least two brake-release systems each comprising:

a bore made in the case and having a first open end situated in a substantially axially-extending outer face of the case and a second open end situated facing the first face of the braking piston, the bore extending substantially radially relative to the axis of rotation from its first end, at least over a first segment which is tapped in a region adjacent to the first end of the bore, which bore has an end wall situated in the vicinity of its second end and at least partially closing said bore towards the axis of rotation;

a screw disposed in said tapped region and suitable, on being screwed into said first segment, for moving substantially radially relative to the axis of rotation; and displacement transfer means suitable, when the screw is screwed in, for urging the piston towards its second position, said transfer means comprising at least one intermediate member suitable, under drive from the screw being screwed in, for rolling on said end wall of the bore to move substantially axially towards the first face of the braking piston.

When the screw is placed in the bore (in its first segment), its head projects substantially radially beyond an axially-extending face of the engine case. To provide mechanical brake release, it suffices to turn the screw in the bore such that via the displacement transfer means, it urges the braking piston in its second axial displacement direction. The displacement transfer means transform the substantially radial displacement of the screw into axial displacement of the piston.

When the space in the region of the axial ends of the motor is small, or when its ends are inaccessible because the motor is axially integrated in the transmission system of a vehicle, the axially-extending face of the case remains easily accessible and the screw can be driven without difficulty from said face.

By an appropriate choice of displacement transfer means, e.g. in the form of one or more transfer balls suitable for cooperating (directly or indirectly) with the shank of the screw, or in general in the form of a rolling member such as a wheel, it is possible to obtain a mechanical advantage effect such that relatively small radial force applied on the screw gives rise to effective axial displacement of the braking piston.

It is advantageous for the device to have two brake-release systems situated in symmetrical positions about the axis of rotation. Insofar as the braking means and the thrust zone of the piston are generally circularly symmetrical about the axis of rotation, this disposition makes it possible to distribute the axial displacement forces around the circumference of the piston.

Advantageously, for each brake-release system, the end wall of the bore forms a first ramp sloping towards the axis of rotation in the direction going towards the first face of the piston, and the transfer means comprise a transfer bore disposed on said ramp and suitable for rolling thereon under the effect of the screw being screwed in.

As explained below, the ball may cooperate directly with the end of the screw or it may cooperate with an intermediate member disposed between said ball and the screw, said intermediate member being constituted, for example by a sealing plug.

In a variant, for each brake-release system, the bore extends along a single substantially radial segment, and the first face of the piston has a second ramp situated substantially facing the first ramp and inclined in the opposite direction, the transfer ball being held between said first and second ramps and the end of the screw (an intermediate sealing member optionally being placed between the ball and the screw).

For example, the second ramp is made on a chamfer formed in the region of the outer edge of the first face of the piston, or on a notch situated in the first face of the piston.

In another variant, for each brake-release system, the bore extends along a single substantially-radial segment, and the first face of the piston has a depression suitable for partially receiving two receiver balls such that said balls project from said first face and cooperate with the transfer ball.

In yet another variant, for each brake-release system, the bore has a substantially radial first segment and a substantially axial second segment which is open at the second end of said bore, the first ramp being provided in the connection zone between said first and second segments, at least one receiver ball being disposed in the second segment, the transfer ball being suitable, when the screw is screwed in, for cooperating with the receiver ball to constrain said bell to project beyond the second end of the bore.

Advantageously, for each brake-release system, the device includes means for preventing the intermediate member(s) from leaving the bore when the screw is removed from said bore.

The braking device of the invention can be fitted to a hydraulic motor comprising:

a case having main fluid feed and exhaust ducts;

a reaction member secured to the case;

a cylinder block mounted to rotate about an axis of rotation relative to said reaction member and including a plurality of cylinder-and-piston assemblies disposed radially relative to the axis of rotation and suitable for being fed with fluid under pressure;

an internal fluid distributor secured to the case relative to rotation about the axis of rotation and including distribution ducts suitable for putting the cylinders into communication with the main fluid feed and exhaust ducts; and an internal shaft extending inside the case coaxially with the axis of rotation and secured to the cylinder block relative to rotation about the axis of rotation.

The brake case of the braking device is constituted by a portion of the motor case, and the internal member of said device is constituted by the internal shaft of the motor. The shaft may be constituted directly by the drive shaft, or it may be a separate brake shaft inside the case and in alignment with the drive shaft.

BRIEF DESCRIPTION OF THE DRAWINGS

The invention will be well understood and its advantages will appear more clearly on reading the following detailed description of embodiments given as non-limiting examples. The description refers to the accompanying drawings, in which.

MORE DETAILED DESCRIPTION

Figure 1:
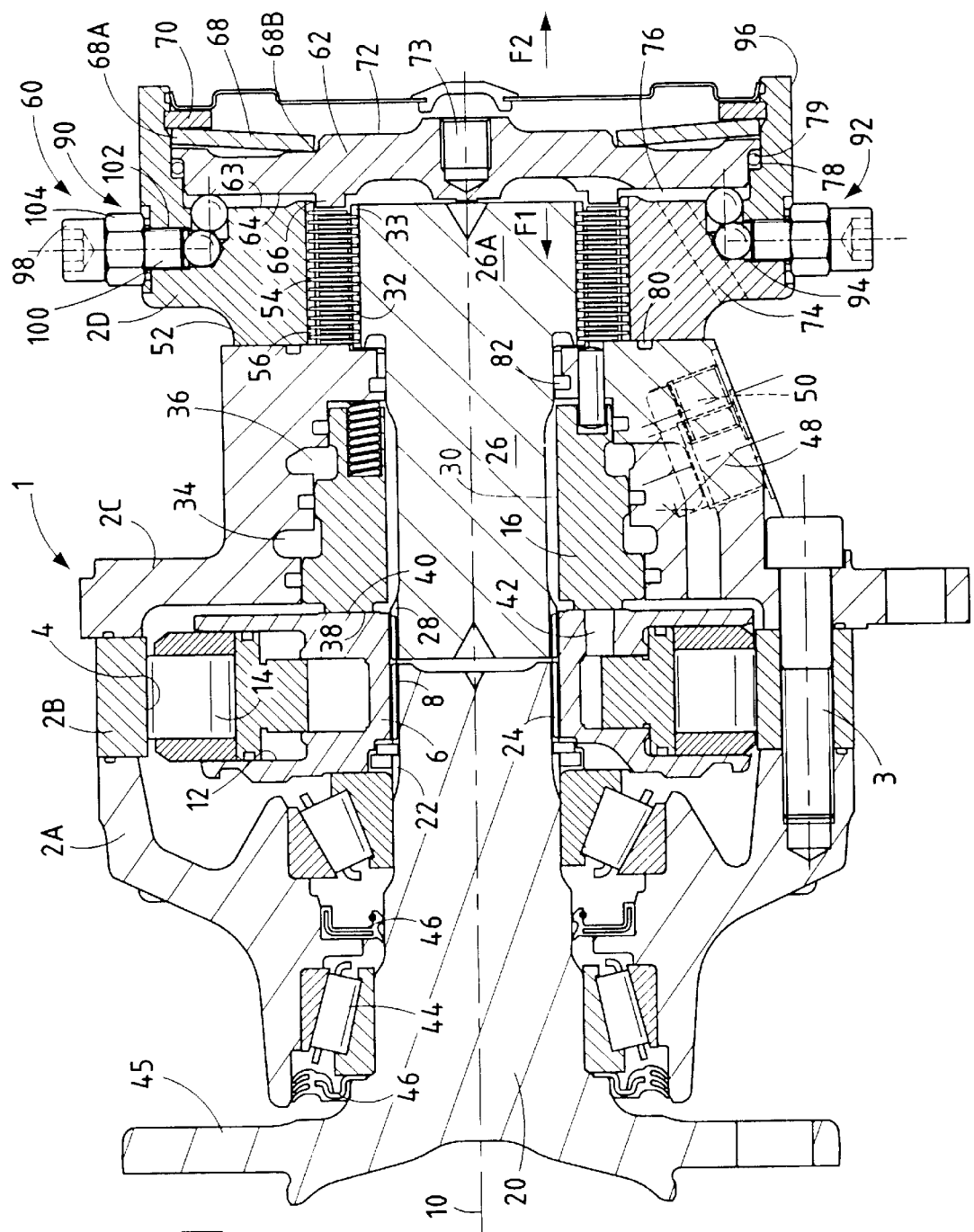
FIG. 1 is an axial section through a motor fitted with a braking device of the invention.

FIG. 1 shows a hydraulic motor 1 which comprises:

a fixed case made up of four portions 2A, 2B, 2C, and 2D which are assembled together by screws 3;

an undulating reaction cam 4 formed on the inside periphery of case portion 2B;

a cylinder block 6 having a central bore 8 and mounted to rotate about an axis of rotation 10 relative to the cam 4, the cylinder block having a plurality of radial cylinders 12 suitable for being fed with fluid under pressure, and containing pistons 14 slidably mounted therein;

an internal fluid distributor 16 secured to the case concerning rotation about the axis 10 and including feed ducts suitable for communicating with the cylinders 12;

a shaft 20 which extends inside the case coaxially with the axis of rotation 10 and is engaged with the cylinder block via axial fluting 22 formed on the periphery of the shaft and fluting 24 formed in the bore 8 of the cylinder block; and a brake shaft 26 likewise engaged with the cylinder block via fluting 28 on its outer periphery and co-operating with the fluting 24 in the bore of the cylinder block, said shaft 26 passing through a bore 30 in the distributor 16 and having an extension 26A situated beyond the distributor and carrying brake disk plates 32.

Grooves 34 and 36 are formed between case portion 2C and the internal distributor 16. Feed ducts (not shown) open out firstly into one of these grooves and secondly into the distribution face 38 of the distributor 16 which is perpendicularly to the axis 10 and pressed against the communication face 40 of the cylinder block. In this face 40, which is likewise perpendicular to the axis 10, there open out cylinder ducts 42 which are organized to be capable of being put into communication with the distribution ducts.

The motor shown has only one operating cylinder capacity, however it would be equally possible to use a motor having two cylinder capacities.

The shaft 20 is mounted to rotate relative to the case about the axis of rotation 10 via roller bearings 44. The free end of the shaft is situated outside the case and includes a coupling plate 45 enabling it to be secured to a member that is to be rotated by the motor. Various gaskets 46 provide sealing of the space inside the case relative to the outside of the motor.

The motor also includes main fluid feed and fluid exhaust ducts 48 and 50, disposed in case portion 2C and opening out into the grooves 34 and 36 respectively.

It should be observed, that in the example shown, the brake shaft 26 is a piece that is separate from the drive shaft 20. Nevertheless, it could be implemented as an extension of the drive shaft 20, extending through the bore 30 through the distributor and including an extension 26A projecting beyond the radially-extending face of the distributor that is remote from the cylinder block, with said extension carrying the braking means.

The motor 1 has a braking device 60 which comprises a brake case 2D which constitutes a fourth portion of the case, connected to the portion 2C by screws (not shown). Overall, the outline of the brake case 2D is circularly symmetrical about the axis of rotation 10. The extension 26A of the brake shaft 26 projects beyond the axial end 52 of the portion 2C of the case remote from the cylinder block 6, and extends inside the brake case 2D. This extension 26A constitutes the above-mentioned member inside the brake case.

The device 60 comprises a first series of annular brake plates 54 or "brake disks" which are constrained to rotate with the brake case 2D. To this end, these plates have indentations in their radially outer edges of a shape complementary to fluting 56 formed in a central bore of the brake case 2D. The plates in above-mentioned series 32 are constrained to rotate with the brake shaft 26, and for this purpose their radially inner edges have indentations that are complementary in shape to axial fluting 33 formed on the periphery of the extension 26A of the brake shaft.

The device 60 also includes a brake piston 62 whose face 64 directed towards the inside of the case 2D (i.e. facing towards the distributor and the cylinder block) has a thrust zone 66 with an end that extends substantially transversely relative to the axis 10. A spring washer 68 resiliently urges the brake piston 62 to move in a first direction F1 towards its braking position shown in FIG. 1, in which position the thrust zone 66 urges the plates 32 and 54 axially into braking contact. For this purpose, the radially outer end 68A of the washer 68 is axially secured relative to the case 2D by means of a stop ring 70, while its radially inner end 68B co-operates with the outer face 72 of the piston 62 remote from its face 64.

The plates 54 are interposed between the plates 32, and vice versa. It will be understood that when the thrust zone 66 thrusts the plates axially in direction F1, braking friction is established between the radially-extending faces of the plates which cooperate with one another, said plates being held axially by the axial end 52 of the case 2C which constitutes a shoulder remote from the thrust zone 66.

In the example shown, the plates 54 and 32 respectively constitute the above-mentioned first and second brake means. Other types of brake means could be used, for example two complementary portions of a claw coupling, the essential point being that said brake means are capable of being engaged in braking contact or of being disengaged from said contact by relative axial displacement The braking device 60 also includes hydraulic means enabling the braking piston 62 to be displaced axially in the direction F2 against the action of the spring washer 68 to bring the piston into a brake-release position in which braking contact is eliminated. The direction F2 is opposite to direction F1, and it will be understood that when the thrust from the thrust zone 66 in the direction F1 against the plates ceases, then the plates 32 and 54 can rotate freely relative to one another, and friction contact between them is eliminated.

These hydraulic means comprise a braking fluid feed duct 74 shown in dashed lines in FIG. 1 (it does not lie in the plane of the figure), and a brake-release chamber 76 formed adjacent to the first face 64 of the braking piston, with the duct 74 opening out into said chamber. Conventionally, this chamber is closed by a sealing gasket 79 against the outer axially-extending face 65 of the piston and the inner axially-extending face 78 of the case 2D, by a gasket 80 between the portions 2C and 2D of the case, and by a gasket 82 between the inner periphery of the case 2C and the outer periphery of the brake shaft 26. It will be understood that feeding the chamber 76 with fluid under pressure tends effectively to urge the piston 62 to move in the direction F2.

The braking device 60 also includes mechanical brake-release means serving to bring the brake piston 62 into its brake-release position and to hold it there, regardless of whether or not the chamber 76 is being fed with fluid under pressure. This mechanical brake-release position is used in particular when it is desired to tow a vehicle whose transmission is fitted with the motor 1.

The brake-release means fitted to the FIG. 1 device comprise two brake-release systems given respective references 90 and 92, which systems are disposed in positions that are symmetrical about the axis of rotation 10. These two systems are analogous, and for simplification purposes, only one of them, the system 90, is described. This system comprises a bore 94 formed through the case 2D and opening out firstly in the substantially axially-extending outer face 96 of the case 2D and secondly in the vicinity of the face 64 of the piston 62. The shank of a screw 98 is movable in a segment 100 of the bore 94, which segment is substantially radial, going from the axially-extending face 96 of the case 2D and having at least one tapped region 102 with which the threaded shank of the screw co-operates. The axis of the segment 100 is radial or inclined by no more than a few degrees (10° at the most) relative to a radial plane.

A spacer 104 is disposed between the head of the screw 98 and the axially-extending wall 96 of the case 2D. This spacer constitutes safety means serving to prevent the screw 98 being tightened by accident, since under such circumstances the motor could no longer be braked normally. With the motor at rest, when it is desired to use the mechanical brake-release means, it is necessary firstly to loosen the screw 98 and to extract it from the bore 94, so as to remove the spacer 104, and subsequently to reinsert the screw in the bore so it can be screwed normally as far as a position in which it presses against the transfer means so as to provide mechanical brake release.

The mechanical brake-release means are described in greater detail with reference to FIGS. 2 to 7, in which elements that are analogous to those of FIG. 1 are given the same references.

Figure 2:
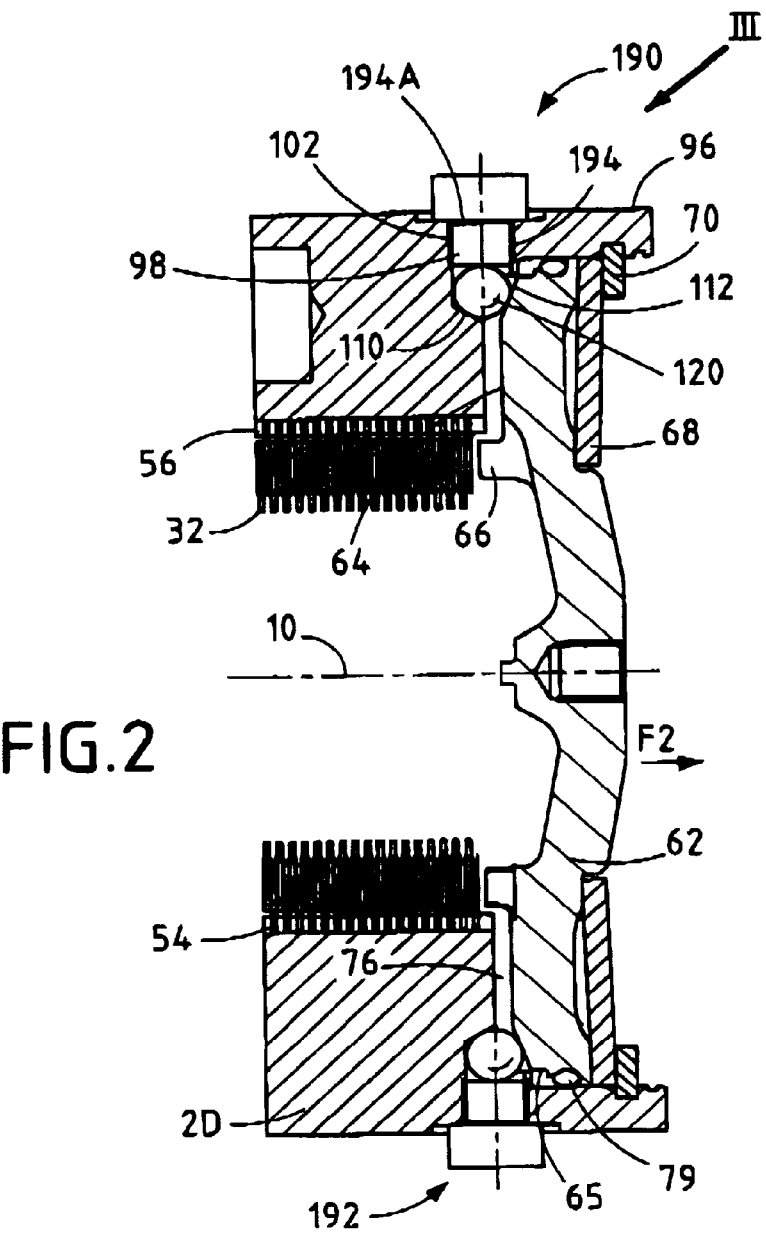
FIG. 2 is an axial section through a variant embodiment of a braking device of the invention.

In the variant of FIG. 2, the brake-release systems 190 and 192 include not only the screw 98, but also a bore 194 constituted by a single segment that is radial or substantially radial and that is consequently extremely easy to machine. The first end 194A of the bore opens out into the axially-extending face 96 of the case 2D. Its second end opens out into the brake-release chamber 76 and opens out facing the face 64 of the piston 62. Nevertheless, this second end has an end wall 110 which partially closes the bore towards the axis of rotation 10. A transfer ball 120 is disposed inside the bore 194 and rests on the end wall 110. This ball 120 extends beyond the opening of the second end of the bore 194 and is consequently suitable for co-operating with the face 64 of the piston 62.

FIG. 2 shows the brake-release position, with the screws of the brake-release systems 190 and 192 being screwed into the tapped regions 102 and pressing against the balls 120 so that they push the piston 62 in the direction F2 and the thrust zone 66 is moved away from the braking plates.

More precisely, the end wall 110 of the bore 194 forms a ramp which is inclined towards the axis of rotation 10 in the direction going towards the face 64 of the piston, i.e. in the direction F2. The ball 120 co-operates firstly with the ramp 110 and secondly with the free end of the shank of the screw. It will be understood that when the screw is tightened, it presses the ball 120 against the ramp 110, and because the ramp is inclined, it tends to cause the ball 120 to project further out from the opening of the second end of the bore 194, i.e. to push it against the face 64 of the piston 62. By rolling over the ramp, the ball 120 transforms the radial screwing movement of the screw into axial movement in the direction F2.

To co-operate with the ball 120, the face 64 of the piston has a second ramp 112 which is situated substantially facing the first ramp 110 and which is inclined in the opposite direction, i.e. it tends to move towards the axis of rotation 10 in the direction F1. This ramp is preferably formed in the outer edge region of the face 64. By way of example, as shown in FIG. 2, it can be made on a chamfer formed in the region of said outer edge, at the junction between the face 64 of the piston 62 and the outer axially-extending face 65 thereof.

Figure 3:
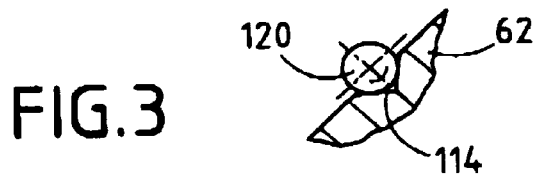
FIG. 3 shows an implementation detail of the FIG. 2 device.

FIG. 3 is a detail view in partial section showing a variant embodiment of the second ramp, shown in a direction corresponding to arrow III in FIG. 2. There can be seen in this figure the ball 120 and the piston 62. In this FIG. 3, the ramp is constituted by a V-notch 114 situated in the face 64 of the piston 62 and preferably, like the chamfer 112, at the junction between the faces 64 and 65 of the piston. The ball 120 co-operates with the two faces of the V-notch 114, which together act as the second ramp and hold said ball in the circumferential direction of the piston.

Figure 4:
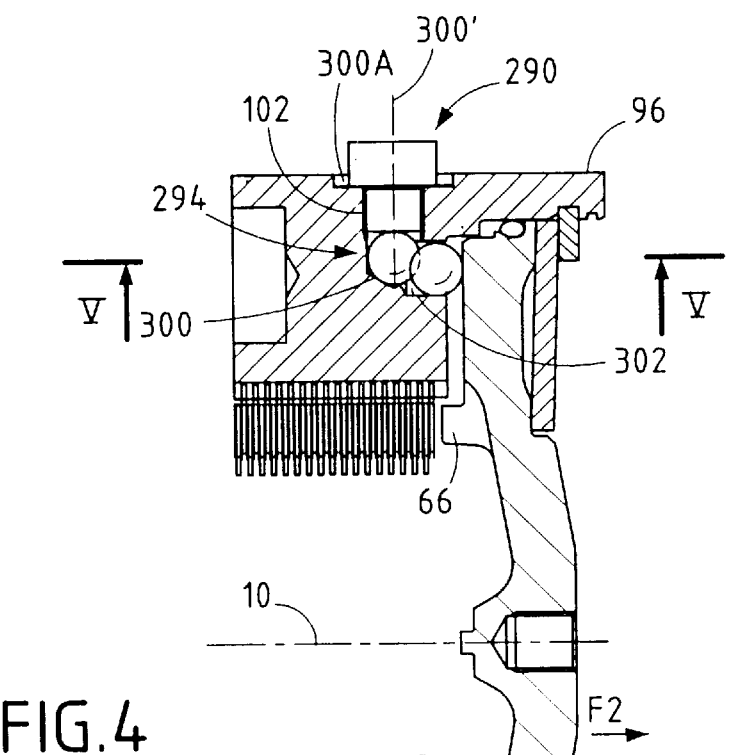
FIG. 4 is an axial section through another variant braking device.
Figure 4A:
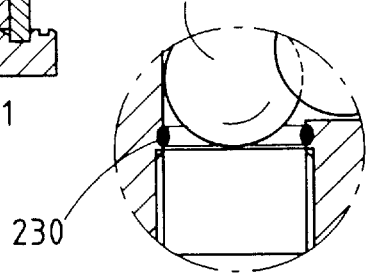

In the variant of FIG. 4, the bore 294 of each of the brake-release systems 290 and 292 comprises a substantially radial first segment 300 in which there is formed a tapped region 102, and a substantially axial second segment 302. The first end 300A of the segment 300 is open in the axially-extending face 96 of the case 2D, while its second end 300D is connected directly to the second segment 302 whose free end 302A contained in a plane that is substantially radial to the axis of rotation 10, faces the face 64 of the piston 62.

The bore 294 has an end wall which closes it towards the axis of rotation 10. Part of this end wall is formed on the end 300B of the segment 300 and the rest of it is formed on the axially-extending face 96 of the segment 302 where it is closest to the axis of rotation 10. This end wall, more precisely the portion of this wall that is formed on the end 300B of the segment 300, forms a ramp 210 which slopes towards the axis of rotation 10 in the direction F2. Transfer balls 220, 221, and 222 are placed in the bore, the ball 220 being suitable for rolling on the ramp 210 while the balls 221 and 222 roll on the axially-extending portion 302B of the end wall of the bore.

Figure 5:
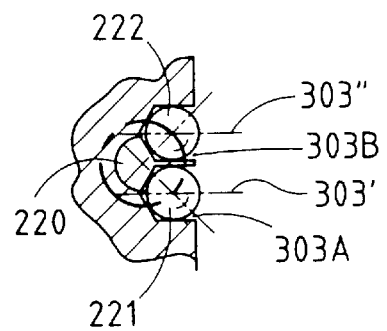
FIG. 5 is a fragmentary diagrammatic view of the FIG. 4 variant on line V—V of said figure.

The disposition of the balls can be seen more clearly in FIG. 5. The ball 220 acts as a transfer ball since, by rolling on the ramp 210, it transforms the centripetal radial displacement of the screw 98 into axial displacement in the direction F2. The balls 221 and 222 are receiver balls which the ball 220 constrains to roll on the wall 302B when it is pushed over the ramp 210, thereby causing them to project beyond the end 302A of the bore 294, and consequently causing them to cooperate with the face 64 of the piston 62 pushing it in the direction F2. In the example shown in FIGS. 4 and 5, two receiver balls are shown, the segment 302 of the bore 294 being constituted by two adjacent portions 303A and 303B in communication with each other and also in communication with the segment 300 whose axis 300' lies on a midplane between the axes 303' and 303" of the portions 303A and 303B.

This disposition makes it possible to distribute the forces exerted by the ball 220 when the screw is tightened equally between the balls 221 and 222. It will be observed that the receiver balls cooperate directly with the face 64 of the piston 62 in a region thereof adjacent to its outer edge. This face may be provided with a wedging indentation for receiving said receiver balls.

Naturally, it would also be possible to use only one receiver ball, cooperating with the transfer ball 220, in which case the axial segment 302 would be constituted by a single portion whose axis lies in the same plane as the axis of the segment 300.

In FIG. 4, reference 230 designates a gasket (visible only in the enlargement) placed in an annular groove formed in the first segment 300 of the bore 194. This groove is situated in the vicinity of the inside end of the tapped region 102. The gasket 230 is disposed in such a manner as to project radially into the bore. In this way, when the screw is removed, e.g. to remove the safety spacer, the gasket 230 prevents the balls of the brake-release means from escaping from the bore.

Naturally, members other than a gasket can perform the same function; in general, such members are suitable for locally reducing the diameter of the bore. An expandable slip ring held in an annular groove or a toothed washer are suitable since they are easily inserted into the bore and are easily wedged into place therein.

The gasket 230 has the advantage of also providing sealing in cooperation with the ball when the screw is removed.

Figure 7:
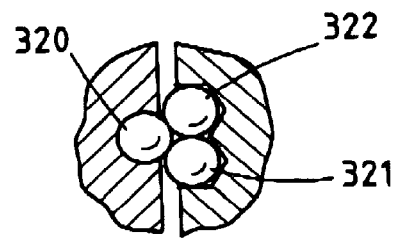
FIG. 7 is a fragmentary section on line VII—VII of FIG. 6.
Figure 6:
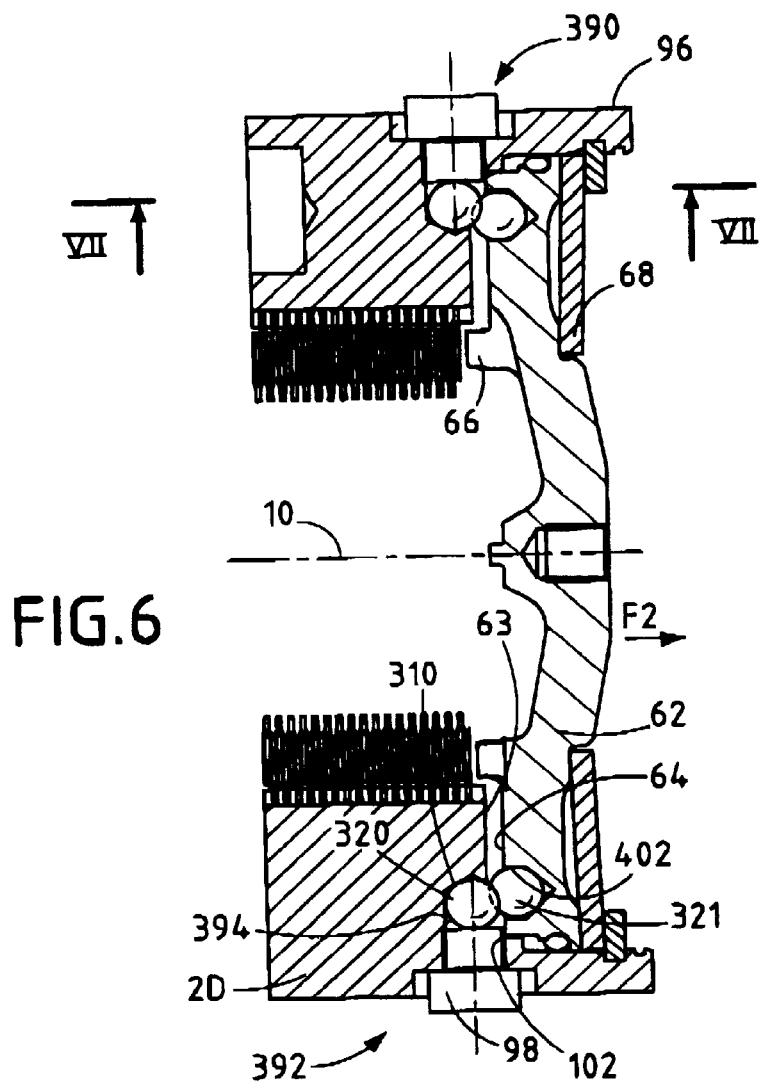
FIG. 6 is an axial section view through another variant embodiment.

With reference to FIGS. 6 and 7, there follows a description of another variant embodiment that likewise makes use of one or more receiver balls. In FIG. 6, each of the brake-release systems 390 and 392 comprises a bore 394 which extends along a single, substantially radial segment. This bore is analogous to the bore 194 of FIG. 2, and like that bore, its end wall includes a ramp 310.

Like the transfer ball 120 of FIG. 1, the transfer ball 320 projects beyond the opening of the bore 394 situated facing the face 64 of the piston 62. This ball 320 cooperates with receiver balls 321 and 322 housed at least in part in a depression 402 formed in the face 64 of the piston 62. Since two receiver balls are present, said depression 402 can be made using two bore portions analogous to the portions 303A and 303B of FIG. 5, except that they are formed in the face 64 of the piston rather than in the portion 2D of the case. The depth of the depression 402 is less than the diameter of the receiver balls 321 and 322, so that they project from the face 64. The ball 320 projects beyond the opening of the second end of the bore 394 against the radially-extending face 63 of the case 2D which is formed to constitute a shoulder and which is consequently situated facing the face 64. Depending on the diameter chosen for the balls 320, 321, and 322, it can suffice for the ball 320 to be suitable for projecting beyond the bore 394, with the balls 321 and 322 then being substantially entirely contained within the depression 402.

Naturally, a single receiver ball could be used, in which case the depression 402 would be constituted by a single bore portion having its axis situated in the same plane as the axis of the bore 394.

Figure 8:
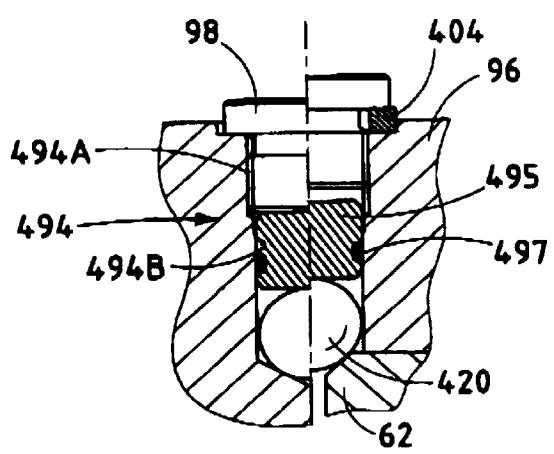
FIGS. 8 and 9 are two fragmentary axial section views showing two other variants.
Figure 9:
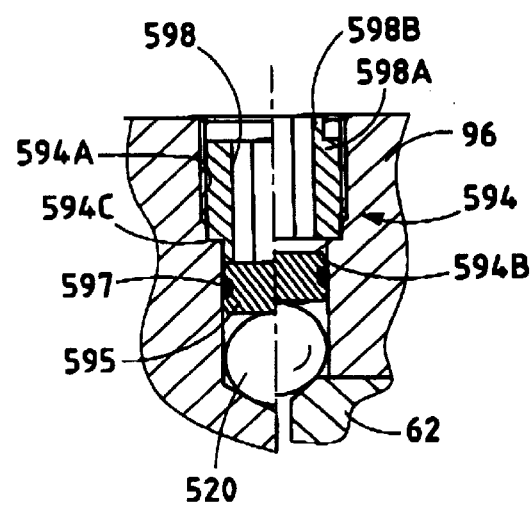

FIGS. 8 and 9 are described below, which show two variant embodiments in which brake-release system includes means for providing permanent sealing in the bore. The term "permanent" sealing is used to mean that these means prevent any fluid escaping from the bore (generally in communication with the brake-release chamber), even when the screw is being manipulated to activate brake release. In particular, as mentioned with reference to FIG. 1, it often happens that the screw must be removed from the bore to remove the safety spacer before it is put back into place and tightened to release the brake. Under such circumstances, the permanent sealing means make it possible to guarantee sealing, even when the screw is temporarily removed.

In FIG. 8, there is shown only an axial section in the immediate vicinity of the bore 494. On the right-hand side of the figure, the screw is shown in its position when the spacer 404 is in place. In the left-hand half, the spacer has been removed and the screw has advanced in the bore 494 to urge the ball 420 so that it pushes away the braking piston 62 thus releasing the brake. In this example, the means for providing permanent sealing are constituted by a sealing plug 495 which is disposed between the end of the screw 98 and the ball 420. This plug is provided with a peripheral sealing ring 497 which cooperates with the wall of the bore 494. Preferably, as shown in the figure, the plug is placed so that it lies in a non-tapped region of the bore 494.

FIG. 9 shows a variant using a screw 598 without a spacer. The plug 595 fitted with its sealing ring 597 is analogous to the plug 495 of FIG. 8. The bore 594, or more generally, the "first" segment of said bore has a shoulder 594C which provides a demarcation line between a larger-diameter region 594A having a tapped region with which the screw cooperates, said larger-diameter region being situated in the immediate vicinity of the first end of the bore, and a smaller diameter region 594B that is not tapped and in which the plug 595 is to be found.

The screw 598 itself has a large portion 598A and a smaller diameter end 598B. In the position in which the motor can operate, as shown on the right-hand side of FIG. 9, it is the larger-diameter portion 598A which is directed towards the end of the bore 594, such that the free end of the screw cooperates with the shoulder 594C without pressing against the ball 520 to push away the piston 62. In order to provide mechanical release of the brake, the screw 598 is loosened by using an appropriate key that cooperates with its internal periphery that is appropriately shaped (for example it can have a through hexagonal socket). Thereafter, it suffices to turn the screw end for end and to insert it so that its smaller-diameter portion 598B is directed towards the end of the bore, as shown on the left-hand side of FIG. 9, in which case the screw bears against the plug 595 which in turn bears against the ball 520 so that it pushes away the piston 62.

FIGS. 8 and 9 show variants that include a sealing plug with a bore of the same type as that shown in FIG. 2, having a single segment that is substantially radial. Naturally, the sealing plug can, in general manner, be disposed in the first segment of the other variant bores. In which case the plug is located between the end of the screw and the "intermediate" member of the displacement transfer means, i.e. in general a transfer ball or wheel.

It is preferable to use two brake-release systems that are situated diametrically opposite each other about the case 2D. It is also possible to use a larger number of brake-release systems that are regularly distributed about the circumference.

It will be observed that in all of the above-described variants, the maximum stroke of the screw is defined by a portion of said screw (e.g. its head) coming into abutment against a region of the first segment of the bore (e.g. the end of said bore on the axially-extending face 96 of the case 2D or the shoulder of said first segment). This coming into abutment determines the maximum displacement of the transfer ball, so that it suffices to give the first segment of the bore a dimension that is appropriate relative to the length of the shank of the screw to define the maximum brake-release stroke so as to avoid any deformation of the washer 68 beyond its elastic limit. By using a plurality of brake-release systems, it is ensured that each of them exerts only a portion of the force required on the axial piston in order to bring it into its brake-release position; this gives rise to a mechanical advantage which means that it is necessary to provide only a small amount of radial force on each screw, thus making it possible to use bores of relatively small diameter.

The bores of the brake-release systems may also act as bores for bleeding the brake system. This can be done merely by removing the screws so that the clearance between the balls and the bores allows the brake to be bled.

Finally, it will be observed that in all of the variants shown, the outer face 72 of the piston 62 has a central thread 73. This makes it possible to use the same type of piston either for conventional brake release by means of an axial screw, or for brake release of the present invention. This gives rise to a considerable reduction in manufacturing cost.

It should also be observed that the brake-release system of the present invention, by making it possible to apply brake-release forces in the vicinity of the periphery of the face 64 of the piston 62, makes it possible to use a piston that is in the form of an open washer, which is compatible with using a drive shaft that passes right through the motor, projecting from both ends thereof, enabling it to be included axially in the transmission system of a vehicle.

I claim:

1. A braking device comprising:

a brake case in which there is disposed an internal member, said case and said internal member being capable of rotating relative to each other about an axis of rotation;

first braking means constrained to rotate with the brake case;

second braking means constrained to rotate with the internal member;

a braking piston having a first face directed towards the inside of the case and having a thrust zone extending substantially transversely relative to the axis of rotation;

resilient means for urging the braking piston axially in a first direction towards a braking position in which the thrust zone urges the first and second braking means axially into braking contact;

hydraulic means for displacing said braking piston axially in a second direction towards a brake-release position in which the braking contact is eliminated; and mechanical brake-release means for bringing the braking piston into its brake-release position, and for holding it there, said means comprising a screw cooperating with a tapped region;

the first and second braking means and the thrust zone of the braking piston being generally circularly symmetrical about the axis of rotation;

wherein the mechanical brake-release means comprise at least two brake-release systems each comprising:

a bore made in the case and having a first open end situated in a substantially axially-extending outer face of the case and a second open end situated facing the first face of the braking piston, the bore extending substantially radially relative to the axis of rotation from its first end, at least over a first segment which is tapped in a region adjacent to the first end of the bore, which bore has an end wall situated in the vicinity of its second end and at least partially closing said bore towards the axis of rotation, a screw disposed in said tapped region and suitable, on being screwed into said first segment, for moving substantially radially relative to the axis of rotation; and displacement transfer means suitable, when the screw is screwed in, for urging the piston towards its second position, said transfer means comprising at least one intermediate member suitable, under drive from the screw being screwed in, for rolling on said end wall of the bore to move substantially axially towards the first face of the braking piston.

2. A device according to claim 1, wherein, for each brake-release system the end wall of the bore forms a first ramp sloping towards the axis of rotation in the direction going towards the first face of the piston, and wherein the transfer means comprise a transfer ball disposed on said ramp and suitable for rolling thereon under the effect of the screw being screwed in.

3. A device according to claim 2, wherein, for each brake-release system, the bore extends along a single substantially radial segment, and the first face of the piston has a second ramp situated substantially facing the first ramp and inclined in the opposite direction, the transfer ball being held between said first and second ramps and the end of the screw.

4. A device according to claim 3, wherein the second ramp is made on a chamfer formed in the region of the outer edge of the first face of the piston.

5. A device according to claim 3, wherein the second ramp is made on a notch situated in the first face of the piston.

6. A device according to claim 2, wherein, for each brake-release system, the bore extends along a single substantially-radial segment, and the first face of the piston has a depression suitable for partially receiving two receiver balls such that said balls project from said first face and cooperate with the transfer ball.

7. A device according to claim 2, wherein, for each brake-release system, the bore has a substantially radial first segment and a substantially axial second segment which is open at the second end of said bore, the first ramp being provided in the connection zone between said first and second segments, at least one receiver ball being disposed in the second segment, the transfer ball being suitable, when the screw is screwed in, for cooperating with the receiver ball to constrain said receiver ball to project beyond the second end of the bore.

8. A device according to claim 1, wherein, for each brake-release system, it includes means for preventing the intermediate member(s) from leaving the bore when the screw is removed from said bore.

9. A device according to claim 1, comprising two brake-release systems situated in symmetrical positions about the axis of rotation.

10. A device according to claim 1, including, for each brake-release system, means for providing permanent sealing in the bore.

11. A device according to claim 10, including, for each brake-release system, a sealing plug which is disposed in the first length of the bore between the end of the screw and said at least one intermediate member.

12. A hydraulic motor comprising:

a case having main fluid feed and exhaust ducts;

a reaction member secured to the case;

a cylinder block mounted to rotate about an axis of rotation relative to said reaction member and including a plurality of cylinder-and-piston assemblies disposed radially relative to the axis of rotation and suitable for being fed with fluid under pressure;

an internal fluid distributor secured to the case relative to rotation about the axis of rotation and including distribution ducts suitable for putting the cylinders into communication with the main fluid feed and exhaust ducts; and an internal shaft extending inside the case coaxially with the axis of rotation and secured to the cylinder block relative to rotation about the axis of rotation, the motor including a braking device according to claim 1, the brake case being constituted by a portion of the case of the motor, and the internal member being constituted by the internal shaft.

* * * * *